United States Patent [19]
Middleton

[11] 3,798,884
[45] Mar. 26, 1974

[54] TOBACCO HARVESTER
[76] Inventor: Carlisle A. Middleton, 38 Dungarrie Rd., Baltimore, Md. 21228
[22] Filed: May 31, 1973
[21] Appl. No.: 365,564

[52] U.S. Cl. .............................................. 56/27.5
[51] Int. Cl. ........................................... A01d 45/16
[58] Field of Search ........................ 56/27.5; 214/5.5

[56] References Cited
UNITED STATES PATENTS
2,477,068   7/1949   La Motte ............................. 56/27.5
2,693,070   11/1954  Gaut et al. ........................... 56/27.5
2,836,950   6/1958   Anderson ............................. 56/27.5

Primary Examiner—Robert Peshock
Assistant Examiner—J. N. Eskovitz
Attorney, Agent, or Firm—John F. McClellan, Sr.

[57] ABSTRACT

A tobacco harvester having plant cutting, conveying and spacing mechanisms including a special soft-discharge belt conveyor system, a plant protecting and delivering shuttle, a plant stalk centering system, and a thrust-arm conveyor system feeding stalks of tobacco for impaling on a floating spear positioned by jaws which pivotally alternate in operation to permit passage of plants from the spear onto tobacco sticks successively rearwardly aligned with the spear by a tobacco stick positioner as each loaded stick in turn is ejected upwardly by a loaded stick ejector.

21 Claims, 14 Drawing Figures

TOBACCO HARVESTER

This invention relates generally to tobacco harvesting and specifically to a harvester having co-acting cutter, conveyor and spear mechanisms for converting a standing crop to a stick-loaded stalk-hung harvest, ready for placing on the tier-poles of a curing barn.

In the prior art numerous devices for the purpose and for the analogous purpose of saving leaf-crop tobacco have been described in various United States and foreign patents. Among the related U.S. Pat. Nos. 3,593,506, discloses a multiple spear turret shiftable fore-and-aft, 3,396,520 and 3,393,501 disclose circular saw type stalk cutters with belt conveyors, 3,365,082 discloses releasable jaws holding a needle for piercing leaves, 3,347,030 discloses a notched spear with retractable cam-driven holder bars, 3,262,587 discloses a circular cutter co-acting with a conveyor system and magnetically retained spearhead, 3,258,137 discloses a floating spear with rotating helix feed and support, and 3,179,263 discloses a floating spear supported by sticks, magnet and springs.

Among related foreign patents, No. 584,962, Italy, shows an apertured spear with cam-driven bottom supports, in a leaf stringing device, and No. 1,296,556, West Germany, shows a hooked spear for string leaves.

The leaf-crop harvester art is cited for the mechanisms employed; as a practical matter the two types of harvesting present entirely different problems.

In spite of the numerous attempts over the years to supply tobacco harvesters meeting the needs of growers of air-dried or air-cured type tobacco, to this date no prior harvester known to the present inventor has found acceptance as a practical, economically workable mechanism.

At first glance, the problem of mechanizing the harvesting of standing plants of tobacco and preparing them for hanging in a barn for air drying might appear straight-forward. The operations involve only a few major steps: cutting the plants, making an opening through the butt end of each stalk, using the openings through the butts of the stalks to impale the plants on tobacco sticks, six plants to a stick, and loading the filled sticks for transport to barns.

Traditionally all these steps have been carried out by hand. The size and shape of the plants does not make them too difficult to manipulate by hand.

In the field the plants average in height about 5 feet, with the leaves growing directly from the straight central stalk and spreading to an overall plant diameter of about 3 to 5 feet. Rows are typically about 3 feet apart and plants are spaced about 2 feet apart in the rows. The average plant as harvested may weigh from 6 to 10 pounds.

However, even though the problem of mechanized harvesting of standing tobacco plants looks relatively simple, growers are well acquainted with the difficulties of trying to harvest tobacco plants any other way than by hand; the fact is that tobacco has been harvested by hand since first discovered in use by the Indians on the Island of Cuba in October, 1942, on Columbus' first voyage.

When green, air-cure type tobacco bruises easily, causing discoloration and loss of market value on curing. Standing plants cannot economically be planted and maintained in perfect alignment for harvesting. Normal variations in planting and subsequent dislocations by accidental factors of wind, water, and cultivation tend to misalign the plants in the row. Plants vary considerably in height, width and weight within a given row, depending on proximity to adjacent woodland, the quality of the soil, fertilization, drainage, and similar factors. Plants vary in harvesting characteristics from one year to the next in response to variations between growing seasons.

In addition to the above problems, tobacco plants exhude a heavy wax-like gum which accumulates machine surfaces contacting the green plants.

Even if tobacco did not bruise easily, the above variations would make machine harvesting of the individual plants difficult, but in actual practice in which plant bruising is a crucial marketing factor, machine harvesting of air-cure tobacco has not worked.

Within the knowledge of the present inventor, who has designed, built and tested previous harvesters for tobacco and who has kept up with progress in the art, many designs look promising on paper and operate smoothly when built, on dry runs. However, when placed in the field and run down a row of standing plants, even the best prior art devices tend to bruise and tear the plants harvested, frequently destroying plants altogether by mis-feeding and jamming. Some designs require such skillful guiding that numbers of plants are missed, knocked down, and run over in the row. Other designs occasionally fail altogether to spear stalks, or split away portions of stalks.

As with all machinery used in harvesting field crops, the prior art devices have shown the usual high rate of breakdowns and mis-adjustment failures in service. And finally, the complexity and close-tolerance work required for the prior-art devices has tended to make the purchase price so high that even if the devices could function as desired the average grower might hesitate to invest in them. Yet, tobacco is one of the last money crops in which the average sized farm still competes efficiently, although rising wages and shortages of farm laborers make mechanization of the small and medium sized farms necessary to preserve their competitive position.

In view of the above, therefore, a principal object of the present invention is to provide a reliable harvester for air-cure type tobacco.

Another object is to provide a harvester as described which inflicts fewer bruises on the tobacco than the best hand harvesting, assuring top market prices for the cured crop.

A further object is to provide a harvester as described which requires a minimum of labor, a minimum of dollar investment, and a minimum of time to convert a standing crop to a stick-hung crop, ready for placing in the barn.

Yet a further object is to provide a harvester as described which is easy for the average man on the farm to adjust, to guide, and to operate, which requires a minimum of maintenance, and which is durable, safe and handy in the field.

In brief overall summary the invention includes a stalk cutter, an offset-roller belt conveyor for gently holding plants conveyed and a cut plant retainer and synchronizer at the output of the belt conveyor, a conveyor-spacer for urging the stalks in spaced succession, a spear for impaling the stalks urged, a pivotal alternating-gripper system for the spear allowing passage of the stalks urged, a stick holder aligned with the spear, a stick ejection and delivery system, and a synchronizing power system for driving the operating parts in unison.

The above and other objects and advantages of the invention will become more readily apparent on examination of the following description, including the drawings, in which, like numbers indicating like parts:

FIGS. 1, 2, 3 and 6 are shown schematically in part.

INTRODUCTORY DESCRIPTION OF THE PLANT HANDLING SYSTEMS AND OF THE OPERATION OF THE HARVESTER

Referring now to the Figures in more detail, FIGS. 1-8 show the overall relations of the operating systems of the invention 10, which may be self-propelled but which in the preferred embodiment shown is provided with a tongue 12 (FIGS. 1 - 3) for movement by a towing vehicle $t$.

The tongue is disposed in a fore-and-aft direction and connects with the axle 14 of the vehicle which has supporting wheel 16 on each end. The axle is fixed transverse to the tongue with about one-third of the length of the axle on the near side, or right side of the vehicle looking forward. The remainder of the axle extends to the far or left side of the vehicle to provide room for canting or diagonally offsetting the frame 18 of the vehicle to the left, so that a pair of plant gathering guides 20 is offset to engage plants p in a row clear of the towing vehicle which as shown, is passing over a harvested row.

Figure 1:
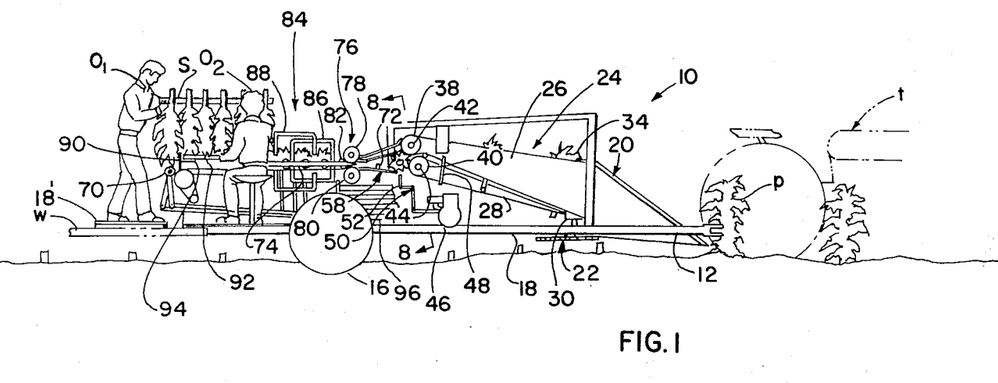
FIG. 1 is a side elevation of the harvester of this invention.
Figure 2:
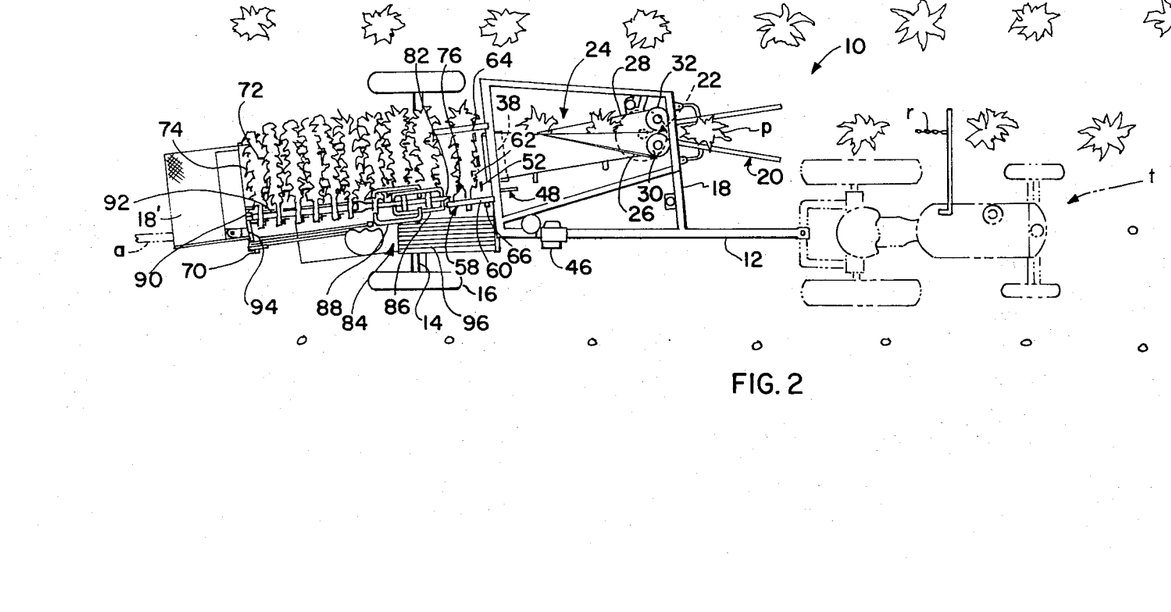
FIG. 2 is a plan view corresponding to FIG. 1.
Figure 3:
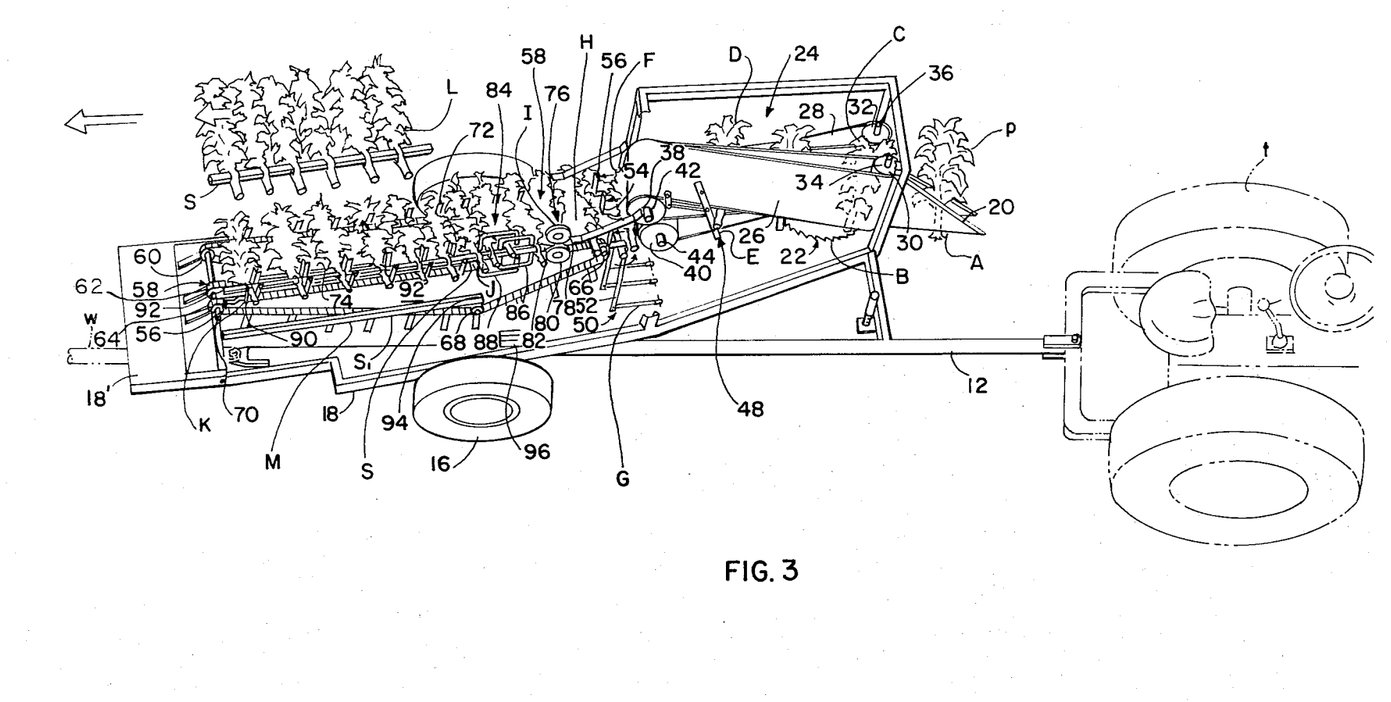
FIG. 3 is an isometric diagram corresponding to FIGS. 1 and 2 but looking down at the right side of the invention.
Figures 4, 5, 6:
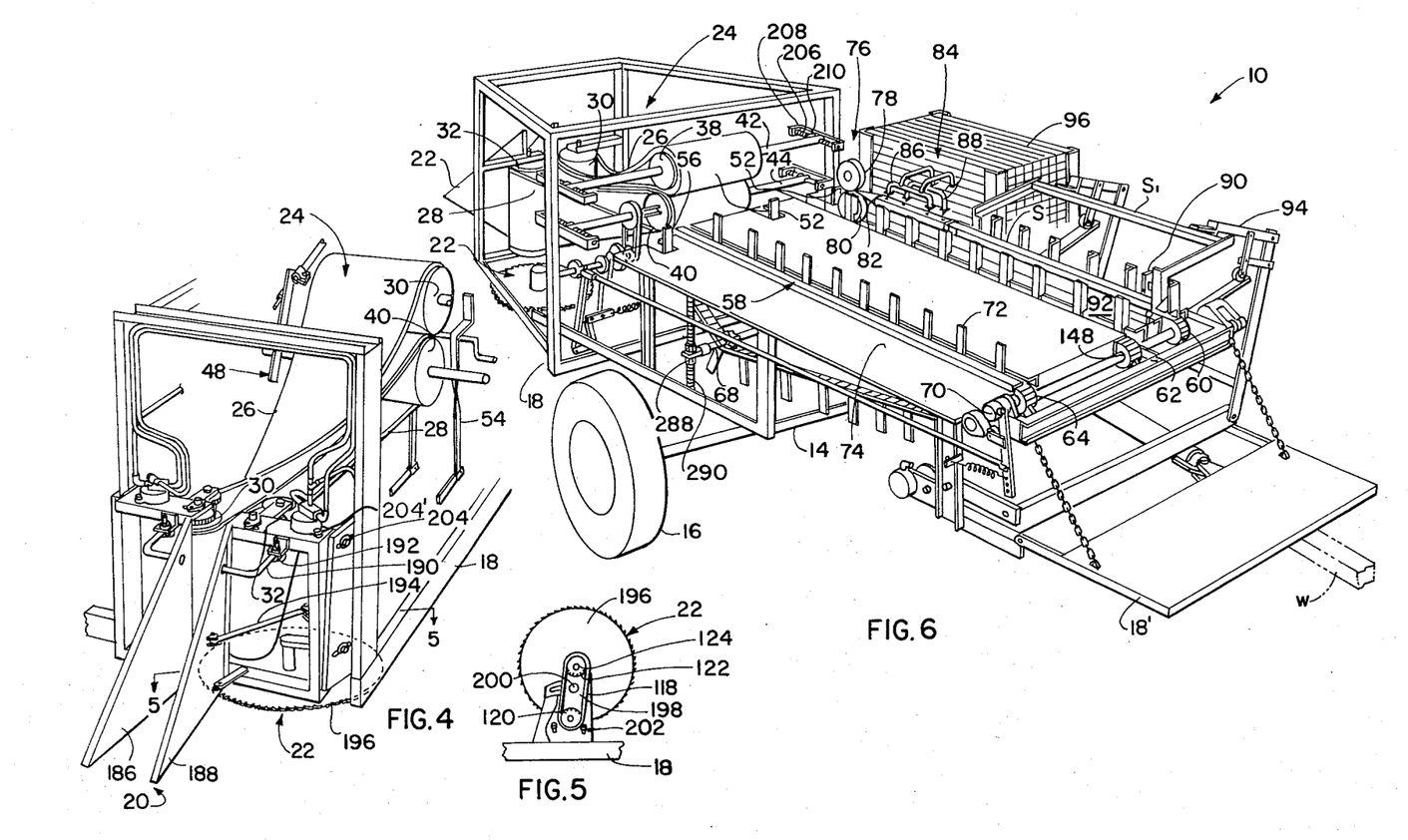
FIG. 4 is an isometric detail of the front of the invention.
FIG. 5 is a plan detail taken at 5—5, FIG. 4.
FIG. 6 is a rear quarter isometric view of the invention.
Figure 7:
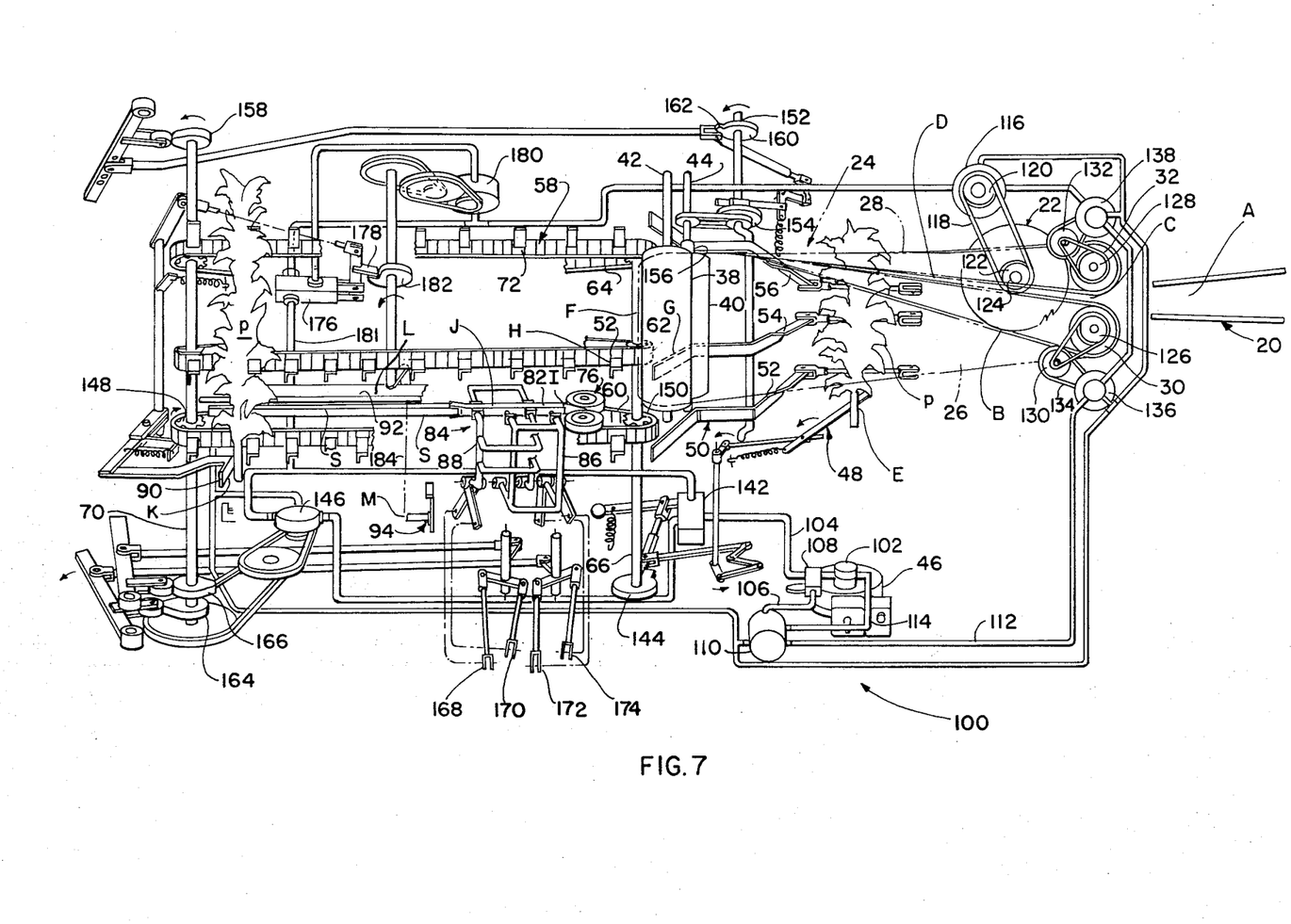
FIG. 7 is an isometric diagram showing the plan of the actuation and control of the invention.

In operation, the stalks of standing tobacco plants $p$ are funneled between the pair of guides 20 on forward motion of the harvester (Station A, FIGS. 3 and 7) and are successively severed near the ground by circular-saw system 22 (Station B, FIGS. 3 and 7, and best shown in FIGS. 4 and 5). As each plant is severed from the ground it is gently engaged by a first conveyor system 24 in the nip of a pair of parallel-spaced endless belts 26, 28 (Station C, FIGS. 3 and 7, and best shown in FIGS. 4 and 6) and conveyed in a rearward and upward direction by light compression between the belts.

The belts are preferably fabric backed and are faced with a one-half inch polyurethane foam layer, allowing pickup of the green plants without damage or loss of time. This portion of the system employs proven gathering, cutting and plant pick-up principles developed at the University of Maryland. Once the plant is grasped, however, it then passes through unique mechanisms which are part of this invention, including even the discharge arrangement of the belts, belt adjustment features, and belt actuation.

Rollers 30, 32 at the first conveyor system intake rotate on vertical axles 34, 36 (FIG. 3) fixed to the frame, and rollers 38, 40 at the first conveyor system discharge rotate on horizontal axles 42, 44 fixed to the frame. The resultant 90° twist in the run of the belts lays the plants over to a horizontal position as they rise. The upper roller 38 is spaced about one-half diameter more toward the rear than the lower roller 40, providing downward discharge of the plants, and more importantly, a non-crushing but secure grip at the upper end of the system, since the plants are not discharged between opposed rollers.

Gasoline engine 46 (FIGS. 1, 2 and 7) fixed to the frame of the harvester actuates the various systems.

During operation, the cutter system 22 and the first conveyor system 24 are driven continuously. The remaining operations of the system are sychronously intermittent, in one-plant increments at the forward end for all operations except ejection of the plant-loaded sticks, and in six-plant increments at the rearward end for ejection of the six-plant loaded sticks.

A first sensor arm assembly 48 simultaneously triggers all the intermittent operations of the harvester except the loaded-stick ejection, which is triggered by a second sensor arm to be described later in reference to the last operation.

As each plant $p$ rises (Station D, FIGS. 3 and 7) in the first conveyor system and just before it is released (Station F, FIGS. 3 and 7) the butt of the stalk strikes the first sensor arm assembly 48 (Station E, FIGS. 3 and 7) actuating a shuttle system 50 (Station G, FIGS. 3 and 7; best shown, in relation to the remaining systems, in FIG. 8) positioned below the discharge end of the belt conveyor system to receive each plant discharged. By fore-and-aft rising-and-falling oscillation of the shuttle arms 52, 54, 56, the shuttle action urges the leaves of the plant p away from the return flights of the conveyor belts which would tear the tender leaves on contact and, by intermeshing, transfers the plant rearwardly to the grasp of a second conveyor system or horizontal conveyor system 58 (Station H, FIGS. 3 and 7; best shown in relation to the remaining systems in FIG. 8). The horizontal conveyor system comprises preferably three sprocket-driven endless chain conveyors 60, 62, 64 mounted side by side on parallel forward and lower idler shafts 66, 68, and a rearward drive shaft 70. Each of the endless chains bears a peripheral succession of uniformly spaced plant-urging and spacing thrust arms 72, and the arms of each of the chains are positioned to coincide laterally forming a rank with those of the other chains. Actuation of sensor arm 48 by a plant also causes the horizontal conveyor system to start and stop, moving each thrust arm 72 exactly one space, thrusting each plant conveyed exactly one space to the rear along the deck plates 74. As tobacco plants synchronously delivered from the shuttle are engaged in spaced sequence by the thrust arms of the horizontal conveyor system and thrust in increments rearwardly, the butts of the stalks pass in turn through a vertical centering system 76 comprising a pair of polyurethane-tired upper and lower rollers 78, 80, and in turn are impaled on the point of forward pointing spear 82 (Station I, FIGS. 3 and 7; see particularly FIGS. 6 and 8 also).

The spear is rigidly held at all times in the path of the tobacco stalks between two of the conveyor chains by a spear holding system 84. Spear holding system 84 comprises two pairs of gripper jaws 86, 88. Each pair of gripper jaws 86, 88 alternately pivots open and shut, opening to permit plants p to be thrust past and then shutting to secure the spear while the other gripper jaws open to allow plants to be thrust past them by the thrust arms 72.

As the plants are urged rearwardly over the spear by the intermittent movement of the thrust arms of the second conveyor system, they pass in spaced succession from the spear onto an ordinary wooden tobacco stick s aligned with the rear or butt end of the spear (Station J, FIGS. 3 and 7; see particularly FIG. 6 also).

As each tobacco stick s in turn receives a six-plant load, a second sensor 90 near the rear of the tobacco stick is tripped by the butt of the first stalk loaded (Station K, FIGS. 3 and 7) which has been thrust toward the rear six spaces as five later stalks were loaded, and ejector system 92 raises the loaded stick for manual removal and offloading by an Operator O, standing on frame extension 18', a platform giving access to a wagon drawn behind by a tongue W, (Station L, FIGS. 3 and 7; see also FIG. 8 for general position). An empty stick s1 simultaneously feeds down to the spear-aligned position (Station M) from the stick supply system 94 where loaded by an Operator $O_2$ from a stick supply 96, and the process continues.

ACTUATION AND CONTROL SYSTEM OF THE HARVESTER

FIG. 7 is a schematic diagram of the actuation and control system 100 of the harvester. The following description refers particularly to FIG. 7. However, FIG. 8, a quartering view looking toward the rear, of portions of the invention responsive to sensor arm assembly 48, clarifies the relations of mechanical parts.

Figure 8:
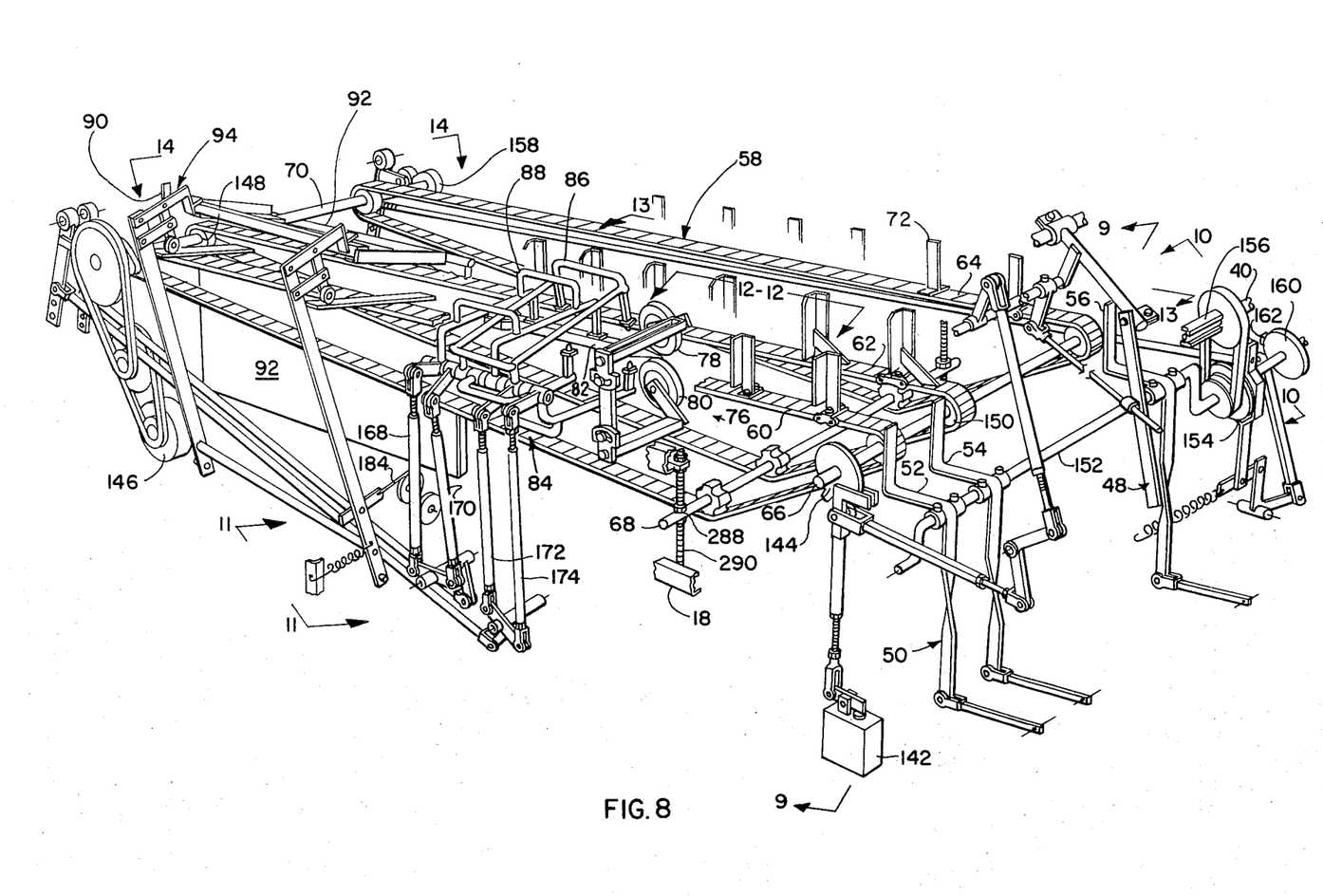
FIG. 8 is an isometric detail with overlying parts removed, adapted from 8—8, FIG. 1.

FIG. 8 is therefore helpful if examined at the same time as FIG. 7 in reference to the parts responsive to actuation of sensor arm assembly 48. Gasoline engine 46 powers hydraulic pump 102 which through pressure line 104 supplies the hydraulic motors driving the system with hydraulic fluid under pressure. Shunt line 106 controlled by metering valve 108 permits fluid to recirculate between reservoir 110 and the pump, producing substantially zero pressure in line 104 and allowing the system to be started under gradually increasing pressure. Fluid return line 112 dumps into reservoir 110 which connects with pump 102 through line 114.

Fluid circulation is clockwise in the diagram. The cutter system 22 and the first conveyor system 24 actuators are serially connected in the pressure line; the remaining actuators have flow bypass lines, paralleling them.

At Station B, circular saw cutter system 22 is driven by hydraulic motor 116 at the cutter through a chain 118 engaging a sprocket 120 on the motor and a sprocket 122 on the cutter axle 124. The cutter runs continuously during operation of the harvester, as noted previously.

At Station C, each of the lower or vertical conveyor rollers 30, 32 has a sprocket 126, 128. Each of these sprockets is similarly driven by a reduction system including a pair of co-axial idler sprockets 130, 132, a chain system 134 and a hydraulic motor 136, 138.

The rollers 30 and 32 counter-rotate and drive the conveyor belts during operation of the harvester, at a lineal velocity about twice the optimum 80 feet/minute velocity at which the harvester is towed over the ground. Thus the momentum of the rollers and belts and the plants carried provides the power necessary to be the instantaneous intermittant demands of the shuttle drive system as described below.

At Station E, sensor arm assembly 48, actuation of which triggers operation of all systems except the ejection system, is adjustably mounted alongside the belts by a mechanism which operates controlling valve 142 when the sensor arm is triggered, and which at the same time co-acts with a cam 144 on the end of forward idler shaft 66 to close valve 142 after one revolution of the forward idler shaft.

Forward idler shaft 66 is revolved through action of motor 146 which responds to the opening of valve 142 by rotating drive shaft 70 through a chain drive reduction system. Rotation of drive shaft 70 draws toward the rear the upper flight of chain conveyor system 58 at Station H, rotating shaft 66 at the forward end of the conveyor system, causing cam 144 to close valve 142 and stop movement of chain conveyor system 58 after moving all thrust arms 72 exactly one thrust-arm-spacing to the rear. Sprockets 148 on the drive shaft 70 and sprockets 150 on the forward idler shaft 66 are made the same diameter, causing the two shafts to rotate in unison.

Simultaneously with the above conveyor movement, the arms 52, 54, 56 of the shuttle system 50 at Station G are oscillated two times by shuttle crank 152 which is driven through a clutch 154 from hub extension 156 of roller 40. Clutch 154 is synchronously engaged by action of cam 158 on the far end of drive shaft 70 through a cam follower and lever arm arrangement indicated generally between the cam and clutch, and described later in sequence of numbering.

The shuttle system 50 is always stopped at the same point in the cycle by a cam 160 having a protrusive lug 162 and affixed to the shuttle crankshaft 152.

Spear holding system 84 at Station J is also synchronously actuated by rotation of driveshaft 70. Through cams 164 and 166 on the drive shaft 70 and a cam follower, bell-crank and pushrod system indicated generally and described later, the clevised ends of the vertical pushrods 168, 170, 172, 174 open and shut the paired sets of spear gripper jaws 86, 88 in alternation.

The remaining hydraulically actuated system, the loaded stick ejector system 92 at Station K drives the stick supply system 94 at Station M through a mechanical linkage.

Ejector system 92 is actuated when sensor 90 at the rear-most end of the stick position is struck by the stalk of a plant p indicating that a full load of six plants has been impaled on a stick s by being pushed back in spaced sequence from the spear by the thrust arms. Through a pivotal linkage indicated generally and described later the sensor 90, the second sensor of the harvester, opens valve 176, at the same time retracting cam follower 178. Motor 180 powered through the valve then rotates ejector shaft 181 one revolution through a reduction drive, in the process lifting stick ejector 184 through a linkage, ejecting the loaded stick upwardly, releasing the cam follower 178 at the low point of cam 182, closing valve 176 and stopping the ejection system until again triggered.

The paired arms of stick supply system 94 are pulled toward the centerline of the harvester as the ejection system operates, by a cable connection 184, and are returned as the ejection system completes a cycle of operation.

It can be seen that the shuttle system and the plant ejector system are actually integral parts of the conveying system, although they are separately described below.

PLANT GUIDE SYSTEM, STATION A

FIG. 4 best shows the details of the plant gathering and guide system 20 which extends forwardly from the canted or offset portion of the frame 18. Each plant guide 186, 188 comprises an upright plate in the general shape of a right triangle with one edge adjustably fixed parallel with the ground by a downwardly curved right-angle pivot bolt 190 attaching the rear edge to the frame 18 of the harvester at an adjustable pivot clamp 192. A diagonal brace 194 on each guide has a threaded adjustment permitting the interguide angle or throat angle to be adjusted. Normally a guide tip separation of about 1 foot is sufficient to gather all plants without undue steering demands on the driver of the tractor, who in any case, has an excellent view down and to his left, of the plant gathering operation, and may employ a conventional pendant-chain row follower r indicated in FIG. 2. The guide separation at the rear end is made generously wide, on the order of about 10 inches, to prevent crushing or jamming the plants being harvested while at the same time keeping them upright for pickup after cutting. The triangular shape of the guides lifts the leaves at the sides of the plants, further preventing plant damage as the guides engage the plants.

CUTTER SYSTEM, STATION B

FIG. 4 best indicates how the circular-saw cutter 196 rotates in a plane a few inches below the rear of the guides and just above ground level of the rows. FIG. 5 shows that saw stub axle 124 has a vertical journal and sprocket 122 for drive chain 118.

FIG. 5 details also the fore-and-aft adjustment of the saw 196 to synchronize cutting with groundspeed and belt speed. With the saw too far forward the plants may tend to fall over slightly before they are gripped between the conveyor belts and with the saw too far back they may tend to be pulled in too early. By pivoting the saw plate 198 and securing it with adjusting bolt 200 the proper setting is easily made. Bolts 202 set chain tension as required, independent of the positional adjustment of the unit.

FIRST CONVEYOR SYSTEM, STATIONS C, D, F

FIG. 4 indicates schematically at bolts 204' how the independent drive of each of the spaced, substantially upright, first conveyor lower rollers 30, 32, is laterally movable with the roller to adjust inter-roller distance for optimum plant pickup and is movable in like manner toward the front or rear to adjust belt vertical tracking and belt tension, providing flexibility of adjustment of both the lower rollers independent of the drive adjustment.

FIG. 6 shows how the upper roller axles 42 and 44 are laterally tipped to adjust belt horizontal tracking, compensating for average plant length to produce the optimum plant stalk butt extension for spearing. Each end of each roller axle 42, 44 has a screw 206 running transversely through it in a horizontal plane. The screws are fixed to the harvester frame by brackets 208. A nut 210 on each screw positions the axle ends along the screws, providing convenient, safe, easy establishment of horizontal tracking of the belts without necessity to approach the belts.

FIGS. 1, 3, 4, 6, and particularly FIG. 13 which is discussed later, show the rearward overhang of the top roller 38 beyond the bottom roller 40, which produces the precisely locating but non-crushing, downward discharge of plants from the first conveyor system. Unlike the situation at the intake end, the cling of the belts at the discharge end is a factor, and the roller offset also eases this factor and gently rotates the plants on discharge, tending to contain the spread.

FIRST SENSOR ARM ASSEMBLY, STATION E

Figure 9:
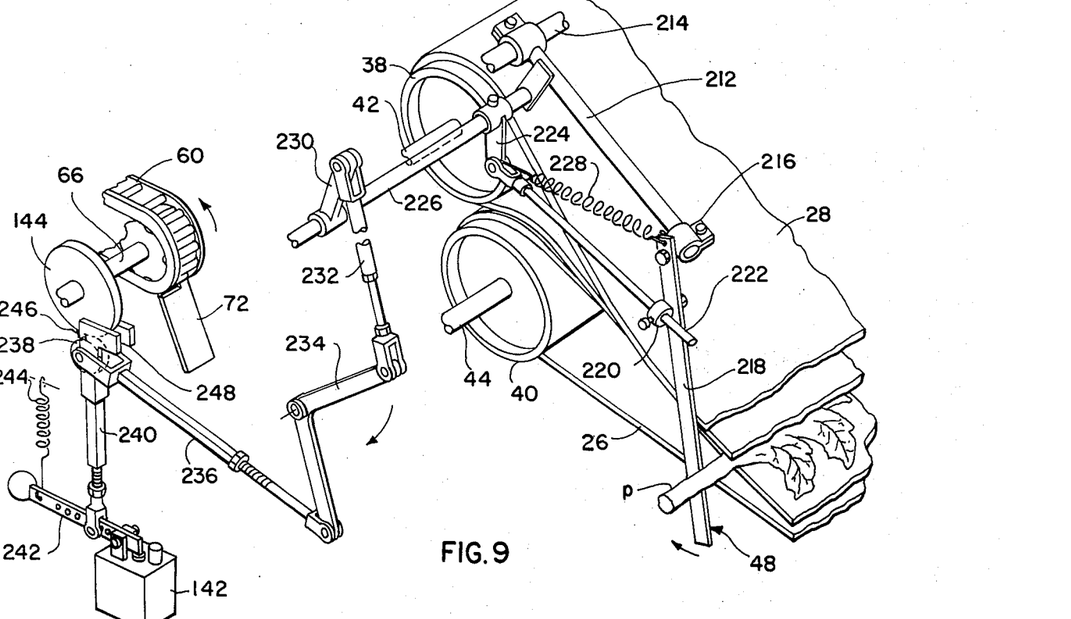
FIG. 9 is an isometric detail taken at 9—9, FIG. 8.

FIG. 9, taken generally at 9—9, FIG. 8, shows the details of the mounting of sensor arm assembly 48 along side belts 26, 28 of the first conveyor system in position to be triggered on contact with the butt of a passing tobacco plant p, and shows also the components transferring the triggering action.

Clamp arm 212 adjustably clamps to a fixed frame rod 214 at one end and at the other end provides a pivotal clamp 216 for holding sensor arm 218. A second pivotal clamp 220 connects pushrod 222 with lever arm 224 on torsion rod 226, and a spring 228 connected between the sensor arm and lever arm provides return tension. A second lever 230 transmits motion from torsion rod 226 through adjustable-length pushrod 232, bellcrank 234 and a further pushrod 236 to a cam follower 238 at the top of a follower arm 240 adjustable linked to a valve lever 242 of valve 142. The valve lever is provided with a spring bias 244 upward and is pushed downward holding the valve closed, by lobe 246 on cam 144, fixed on conveyor shaft 66. When sensor arm 218 is struck the linkage pushes cam follower 238 to the rear, permitting it to rise and valve 142 to open. On release of the triggering pressure as plant p is conveyed upward, the linkage reverts under spring bias and cam 246 closes valve, stopping rotation of shaft 66. Follower guides 248 align the cam and cam follower at all times.

SHUTTLE SYSTEM, STATION G

Figure 10:
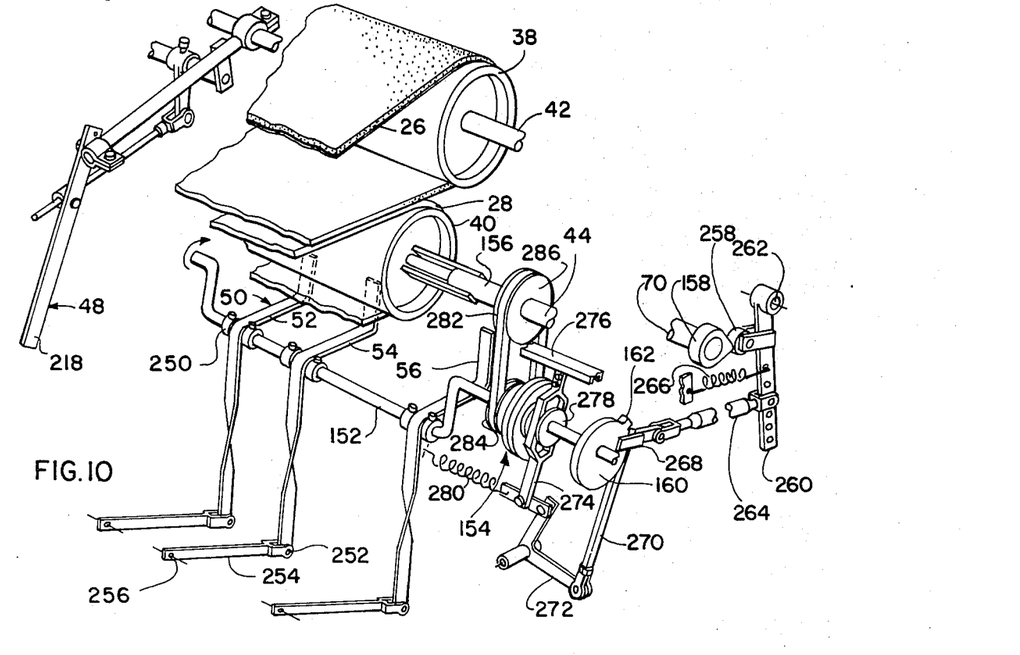
FIG. 10 is an isometric detail taken at 10—10, FIG. 8.

FIG. 10, a detail taken generally at 10—10, FIG. 8, illustrates the shuttle elements, which are, as shown, largely located on the side of the belts 26, 28 which is opposite sensor arm assembly 48.

Axial-engaging clutch 154 connects and disconnects the shuttle crank shaft 152 with hub extension 156 of the lower roller 40. When the clutch is engaged the crank turns, oscillating the arms 52, 54, 56 of the shuttle by means of crankshaft bearings 250 connecting with the arms. The lower ends of the arms have pivots 242 connecting a fixed link 254 on each with a pivot 256 on the frame of the harvester but not shown.

Cam 158 on driveshaft 70 controls the engaging-/disengaging action of clutch 154 by means of a cam follower 258 on a follower arm 260 pivoted to the harvester frame at 262, an adjustable length pushrod 264 opposed by a spring 266 and pivotally connecting the follower arm with a second, flanged cam follower 268 engaging an indexing cam 160 on shuttle crankshaft 152, a linkage including a pushrod 270 connecting the cam follower and a bellcrank 272 which pivotally connects with the bottom of a clutch arm 274 pivoted to a harvester frame member 276 at the top, engaging a flanged extension 278 of the clutch at the center, and having a spring bias 280 at the bottom, opposing the bellcrank. V-belt 282 connects the floating pulley 284 of the clutch with pulley 286 driven by the lower roller hub extension.

In operation when rotation of cam 158 causes rod 264 to be drawn to the rear, lug-type lobe 162 on cam 160 is freed; rod 270 no longer being held down by the lug on the cam rises, allowing spring 280 which raises it to pivot bellcrank 272 engaging the halves of clutch 154 causing rotation of crank 152, which rotation is rapid relative to rotation of driveshaft 70. After two rotations the clutch is disengaged and the shuttle stopped by release of rod 264 through rotation of cam 158. Lobe 162 on cam 160 forces rod 270 down, disconnecting the clutch and holding the shuttle immobilized in position until the next cycle is triggered by impact of the stalk of a conveyed tobacco plant on arm 218 of sensor arm assembly 48, triggering another revolution of driveshaft 152.

The polyurethane belts of the first conveyor system have a special affinity for grabbing and tearing the gummy leaves of tobacco in passing. As noted, the shuttle system prevents the leaves of plants from springing back on the belts, and additionally delivers the plants compactly in exact synchronism between the ranked thrust arms 72 of the chain conveyor system. This third conveyor provision contrasts with old-art devices which transfer plants directly from one endless conveyor system to another, particularly where the first operates continuously and the second intermittently.

THE CHAIN CONVEYOR OR SECOND CONVEYOR SYSTEM, STATION H

FIGS. 6, 7 and 8 best indicate that the spear 82 is closely bounded by two runs 60, 62 of endless chain to apply close-coupled spearing force through the sequentially spaced thrust arms 72 to plant stalks, with the third run 64 spaced apart in position to urge the leafy portions of the plant rearwardly along the deck 74.

All endless chains are tensioned by nuts 288, on vertical jackscrews 290 passing through respective ends of the idler shaft 68, and fixed to the frame of the harvester.

THE IMPALING AND SPEAR HOLDING MECHANISM, STATION J

Figure 11:
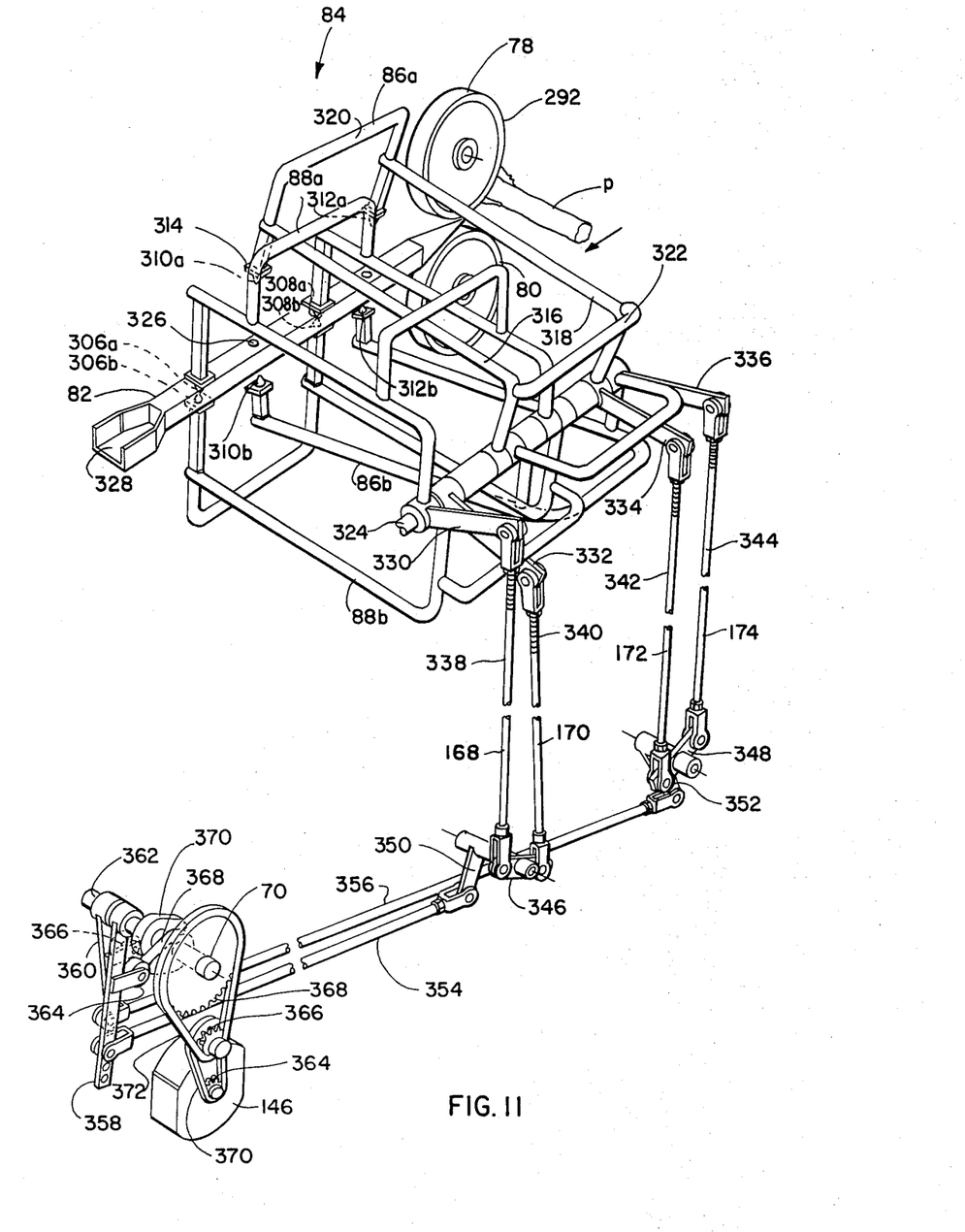
FIG. 11 is an isometric detail taken at 11—11, FIG. 8.
Figure 12:
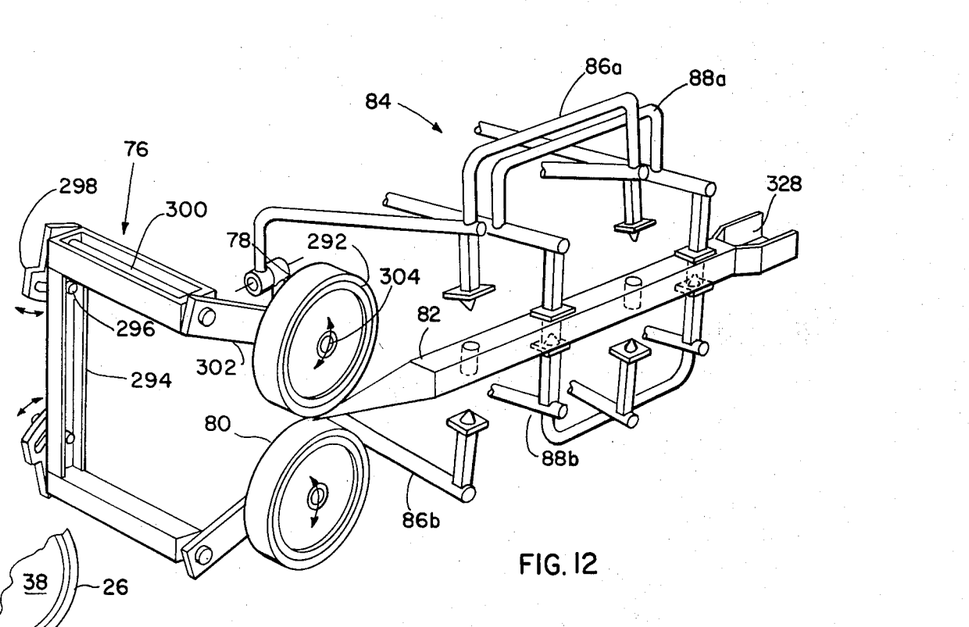
FIG. 12 is an isometric detail taken at 12—12, FIG. 8.
Figure 13:
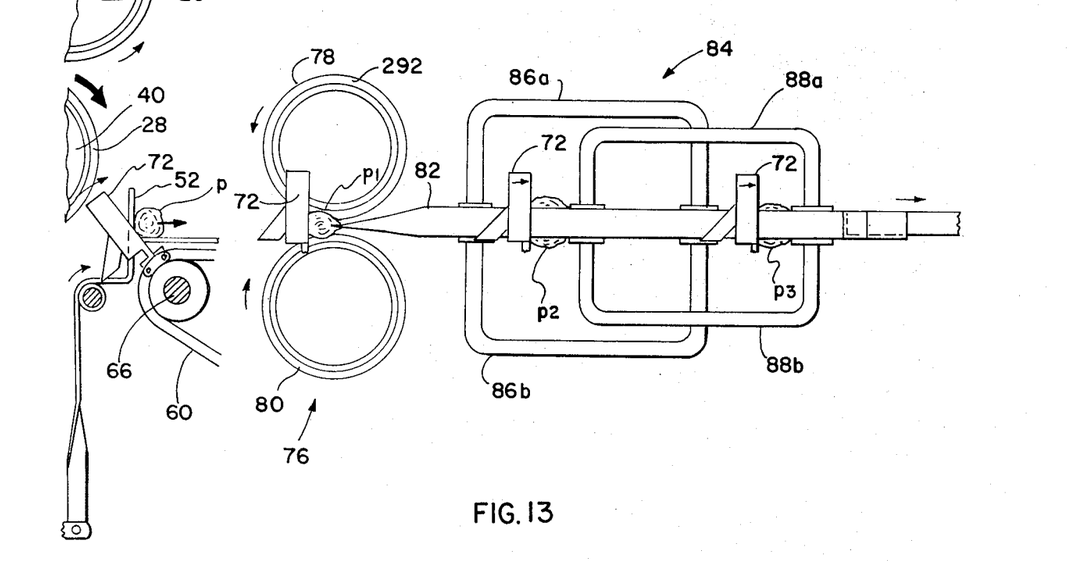
FIG. 13 is an elevation detail taken at 13—13, FIG. 8.

FIGS. 11, 12 and 13, views taken at 11—11, 12—12, and 13—13, FIG. 8, illustrate the relation of the stalk-vertically-centering rollers 78, 80, the spear 82, and the spear gripping system 84.

The rollers have polyurethane tires 292 and are set nearly tangent to the point of the spear 82 by an adjustment system easily reached at any time from the side. Proper adjustment at all times to the average size stalk being speared not only avoids missing stalks but also prevents split-out, since the resilient rollers 78, 80 reinforce the stalks as they are impaled.

FIG. 12 shows that the adjustment system extends to the right side of the harvester as a "U" shaped bracket 294 fixed to the frame and having for each of the rollers a bolt 296 arranged to clamp in angular position a slotted-arc plate 298 welded to the end of a horizontal arm or rod 300 journaled in the bracket and bearing on the roller end a radial link 302 to which the roller axle 304 is fixed. The double headed arrows indicate direction of adjustment. Thus the adjustment can be made precisely with the unit in full operation without danger and without interference with passing plants.

FIG. 11 shows how the two sets of spear holding jaws 86, 88 are mounted in axially overlapping relation and are pivoted open and shut in alternation with each other in a vertical direction to assure that the spear is clamped in place securely at all times by at least two spaced sets of alternately interposed plate-mounted conical teeth or dowel grips 306a, 306b, 308a, 308b, (closed in FIG. 11) and 310a, 310b, 312a, 312b (open in FIG. 11). The grips are positioned for opposing in a vertical plane and gripping the spear. A rubber buffer 314 is secured around the base of each grip to silence and cushion the opposing impacts of the grips on the spear.

Each set of jaws 86, 88 includes an upper jaw 86a, 88a and a lower jaw 86b, 88 b typically comprising a very rigid tubular structure formed in a pair of parallel arcs 316, 318, rigidly connected by transverse crossover arcs 320, 322, all arching for clearance upward in the upper jaws and downward in the lower jaws. The jaws which are transverse to the spear all pivot outboard at a laterally offset horizontal shaft 324 which is fixed to the frame of the harvester generally parallel with the spear, providing maximum stalk clearance at the "throat" of the jaws.

Each dowel grip fits into an opening 326 in the upper face or the lower face as the case may be of square-section spear 82, which is preferably steel. The openings are spaced on equi-distant centers between the pointed forward end of the spear and the upwardly open "U" socket 328 for holding the end of a stick aligned with the rear of the spear.

It will be noted that no part of the spear-gripping system operates in a horizontal plane, the plane of the plants; great additional clearance and freedom from plant fouling are afforded by this provision, and gum build-up is eliminated as a cause of failure. More importantly, however, the arching jaws provided room to accommodate chain 66 and the thrust arms 72 on the chain within the jaws, thereby providing close support on both side of the sections of stalk being speared and being loaded onto the tobacco sticks.

Each jaw has an extending lever arm 330, 332, 334, 336 actuated through an adjustable length (screw-type clevis-end) vertical pushrod 338, 340, 342, 344. The pushrods of each pair of jaws are themselves paired to operate in opposition by a bellcrank 346 and 348, having equal and opposite nominally horizontal arms to which the vertical pushrods attach. Each bellcrank has a third arm 350, 352 driven through an adjustable length horizontal pushrod 354, 356 and a cam follower arm 358, 360 pivoted to the harvester frame at 362 and oscillated by a cam follower 364, 366 and single lobe cam 368, 370. The cams are fixed on driveshaft 180° out of phase and are contoured to provide a slight swell producing a slight overlap period of all jaws in the closed position, assuring failproof grip of the spear at the time of grip transfer as well as at other times.

Hydraulic motor 146 controlled as previously described, rotates the driveshaft through the chain reduction system shown, including drive sprocket 364 idler sprocket 366, driveshaft sprocket 368, conventionally interconnected by chains 370 and 372.

FIG. 12 further indicates the generous stalk clearance provided by the centering system 76 and the jaws of the spear holder system 84. As previously discussed, the lateral position of the stalk butts is adjustable to clear more or to clear less by adjusting tracking of the belts on the conveyor rollers.

FIG. 13, an elevation partly in section, shows the relation of overhanging upper roller 38 to lower roller 40, the relation of the rollers to the shuttle arms represented by arm 52 and to the conveyor system represented by conveyor chain 60 and thrust arms 72, and particularly the relation of the spear 82 to the thrust arms 72 and plants p1, p2, p3 positioned at the dwell position of the thrust arms, just as one set of jaws 86 closes and the other set 88 is about to open. The spear contains two plants p and a third is touching the spearpoint. The proximity of the thrust arms 72 of the two close-by conveyor chains contributes to the precise alignment and rigidity of the plant spearing operation, as previously noted.

Extreme reproduceability and reliability of the spear holding mechanism combined with the great clearance, short stroke, and operator safety during operation and during adjustment at the screw-clevises, result from the rugged pivotal-design spear holding mechanism and spear actuation mechanism. The device is practically impossible to jam, to gum up, or to throw out of synchronism, and runs smoothly and quietly without appreciable change.

EJECTOR SYSTEM, STATIONS K, L AND STICK SUPPLY SYSTEM, STATION M

Figure 14:
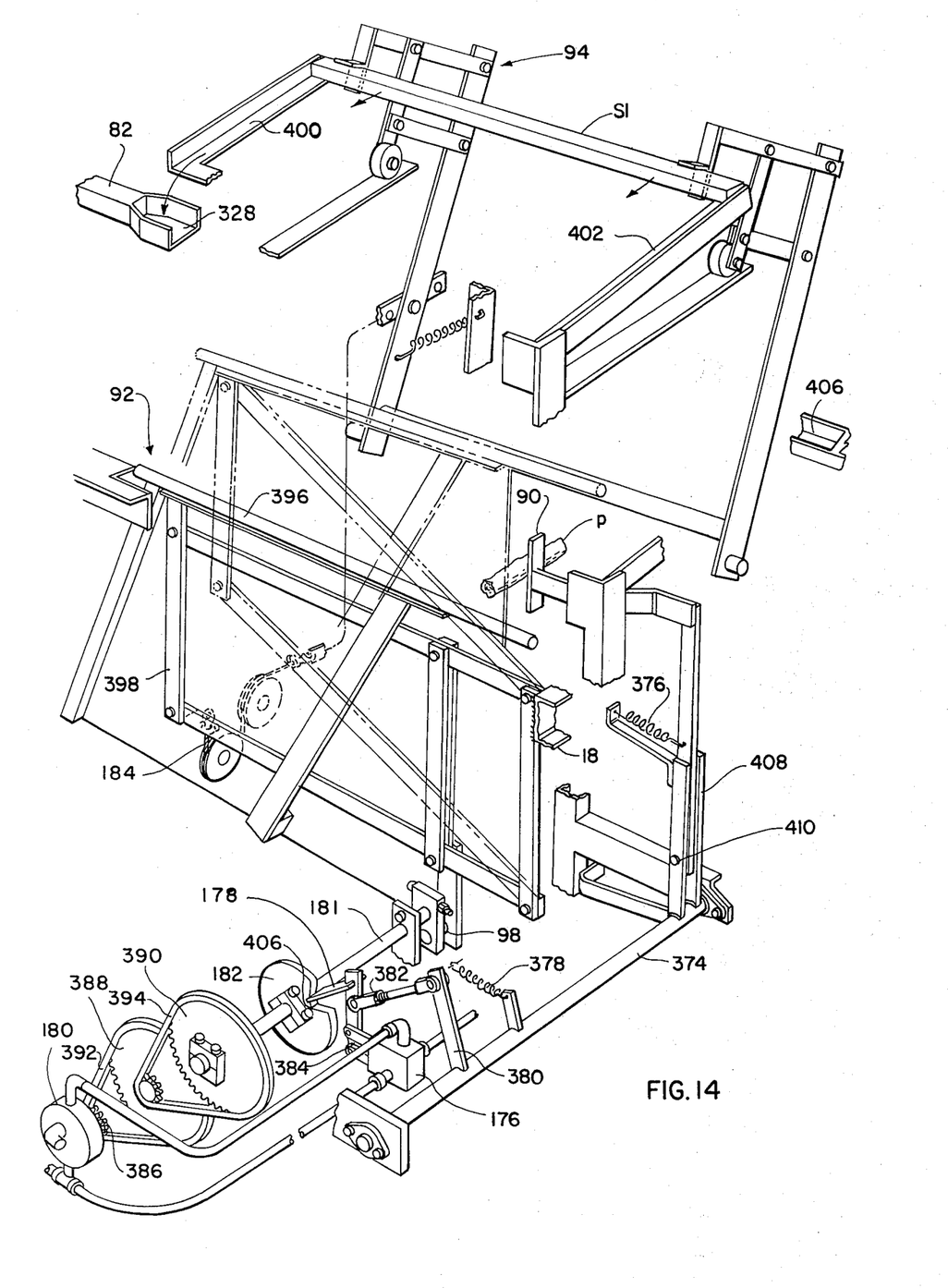
FIG. 14 is an isometric detail taken at 14—14, FIG. 8.

FIG. 14, an exploded diagrammatical detail taken at 14—14, FIG. 8 shows a plant stalk p actuating the second sensor arm or full stick sensor arm 90 which pivots about crank axle 374 against the restoring forces of spring 376 and 378 to open valve 176 through lever 380, pushrod 382 and valve linkage 384, starting hydraulic motor 180, rotating shaft 181 through reduction drive comprising sprockets 386, 388 and 390 and chains 392 and 394, thus rotating cam 182 and holding valve 176 open through contact between the constant diameter portion of the cam, until one rotation of shaft 181 has been made. During the rotation, stick ejector frame 396 is thrust upward by the action of shaft crank 98 on parallel linkage 398 drawing cable 184 inward and with it drawing inward and downward the pivoted pair of stick supply arms of stick supply system 94, which thrusts a replacement stick s1 along ways 400, 402 against the side of panel-like ejector frame 92. When the ejector frame 92 lowers, the stick falls into the spear socket 328 and the rear socket 404, ready to receive plants from the spear. The member 92 being a smooth panel, cannot cath the hand of the operator and cannot jam on plants or splinter sticks. The plants are drawn after the stick as it is ejected upward, and when lifted cannot crumple or bruise.

At the end of 360° of rotation of shaft 181 and cam 182, cam follower 178 falls into depression 406 of the cam, shutting off valve 176.

Since the valve 176 has a fixed travel sensor arm 90 is pivoted at 410 to guide arm 408 on shaft 374, permitting over-run against spring tension of spring 376, without damage to the valve when sensor arm 90 is thrust farther to the rear than necessary to actuate the valve.

Through the overall plant handling in response to the two sensors and terminating with the ejector system, it can be seen that missed plants, if any, cannot disrupt the proper functioning of the system.

Obviously many modifications and variations of the present invention are possible in light of the above teachings. It is, therefore, to be understood that within the scope of the appended claims the invention may be practiced otherwise than as specifically described.

What is claimed and desired to be secured by United States letters patent is:

1. In a tobacco harvester having means for guiding, cutting and conveying tobacco plants and for impaling on tobacco sticks the stalks of said tobacco plants cut and conveyed, the improvement comprising: the means for impaling tobacco plants including a spear assembly having a spear with a pointed end and a butt end, first and second sets of upper-and-lower spear gripping jaws for fixing the spear in a horizontal plane, means for opposedly pivoting the respective jaws of each said set of spear gripping jaws about an axis laterally offset from the spear and generally parallel therewith, thereby providing for opening and closing each said set of spear gripping jaws substantially in a vertical plane and for clearing said jaws, from tobacco plants impaled, a plurality of grips fixed on respective of said spear gripping jaws, and said spear having a plurality of recesses for receiving plural of said grips.

2. In a tobacco harvester as recited in claim 1, the conveying means including: a first means for conveying arranged for rearwardly conveying and discharging said tobacco plants cut by the cutting means, a second means for conveying aligned parallel with and extending past the ends of the spear, the second conveying means having a plurality of sequentially spaced thrust arms fixed thereon to travel therewith and thereby successively urge onto said spear tobacco plants conveyed between said arms, and means for oscillating located proximate to and lower than the discharge portion of the first conveying means, said oscillating means arranged for a portion of the oscillation thereof to extend rearwardly past a position of travel of said second conveying means thrust arms, thereby adapting the oscillating means for receiving said tobacco plants from the first conveying means and for transferring in succession said tobacco plants to the second conveying means between respective thrust arms thereof.

3. In a tobacco harvester as recited in claim 2, means for continuously driving said cutting means and said first conveying means: a first sensor arranged adjacent the first conveying means in position for contact by stalks of said tobacco plants conveyed past the first sensor, means for actuating said oscillating means a discrete number of oscillations in response to each contact of the first sensor by a said tobacco plant stalk, means for actuating said second conveying means in response to each contact of the first sensor by a said tobacco plant stalk, and means for limiting the movement of said second conveying means to the distance of one said sequential spacing of said thrust arms for each actuation thereof.

4. In a tobacco harvester as recited in claim 3, said spear having a socket at the butt end thereof proportioned for supporting an end of a tobacco stick in alignment with the spear for thereby permitting tobacco plant stalks impaled by the spear to be loaded onto a tobacco stick aligned therewith under the urging of said second conveying means thrust arms, a tobacco stick end support on the harvester in spaced alignment with the socket on said spear, a second sensor fixed adjacent said tobacco stick end support in the path of movement of tobacco plant stalks during loading onto a said tobacco stick, and means positioned between and below said spear socket and tobacco stick end support for ejecting each said tobacco stick when loaded, in response to each contact of the second sensor by a said tobacco plant stalk.

5. In a tobacco harvester as recited in claim 3, the first conveying means comprising: a pair of laterally spaced upright rollers located behind said guiding means, a pair of vertically spaced horizontal rollers located to the rear of said pair of laterally spaced upright rollers, the upper roller of said horizontal rollers being located more rearwardly than the lower roller of said horizontal rollers, a first endless belt mounted on one of said upright rollers and the lower roller of said horizontal rollers, and a second endless belt mounted on one of said upright rollers and the upper roller of said horizontal rollers.

6. In a tobacco harvester as recited in claim 5, means for adjusting the tracking of said endless belts including: an axle for at least one of said rollers, a transverse screw proximate an end of said axle, and a nut on said screw positioned for contacting a side of said end of the axle.

7. In a tobacco harvester as recited in claim 1, a vertical centering device for plant stalks comprising: upper and lower centering rollers positioned respectively above and below said point of the spear, each centering roller having a resilient periphery, and means for adjusting the position of each centering roller.

8. In a tobacco harvester as recited in claim 7, the means for adjusting centering roller position comprising: a horizontal arm extending to the side of the harvester from each centering roller, a radial link on the end of each horizontal arm, an axle on each radial link supporting a said centering roller, means for rotatably mounting said horizontal arms to the harvester, and means on portions of the horizontal arms away from said centering rollers for adjustably fixing the rotational position of said horizontal arms.

9. In a tobacco harvester as recited in claim 1, wherein each of said spear gripping jaws comprises structure formed in a pair of parallel arcs with crossover arcs transversely connecting the pair of parallel arcs, said arcs arching upward in the upper jaws and downward in the lower jaws, thereby further clearing said spear gripping jaws from tobacco plants impaled and providing room for thrust arms of the second conveying means to pass through said jaws under said arcs.

10. In a tobacco harvester as recited in claim 2, the means for opposedly pivoting the respective jaws of each said set of spear gripping jaws comprising: a shaft defining said laterally offset axis, means for connecting each jaw with the shaft, an arm extending from each jaw, a driveshaft transverse to the harvester, at least one jaw-actuation cam on said driveshaft, means for following said at least one jaw-actuation cam, means for coupling all said cam following means and arm extending from each jaw, a drivemotor, means for coupling the drive motor with the driveshaft, means for controlling operation of the drivemotor, and means for coupling said first sensor with the controlling means.

11. In a tobacco harvester as recited in claim 10, said second conveying means including a plurality of parallel spaced endless chains bearing said thrust arms thereon, a plurality of sprockets mounting each said endless chain, and the means for actuating said second conveying system comprising a sprocket of each said endless chain being fixed on said driveshaft.

12. In a tobacco harvester as recited in claim 11, said means for limiting the movement of said second conveying system to the distance of one said sequential spacing of said thrust arms for each actuation comprising: a cam, means coupling the cam to rotate with a said sprocket, a cam follower at the cam and means coupling the cam follower with said means for controlling operation of the drivemotor.

13. In a tobacco harvester as recited in claim 12, said plurality of parallel spaced chains including at least three chains, one of said chains being proximate one side of said spear and with a portion thereof running through said paired sets of spear gripping jaws, a second of said chains being proximate the other side of said spear, and a third of said chains being distally spaced from the second of said chains.

14. In a tobacco harvester as recited in claim 10, said first conveying means including a roller, said oscillating means including a plurality of substantially vertical shuttle arms, said means for actuating the oscillating means a discrete number of times comprising: a crankshaft, means for engaging the crankshaft with the shuttle arms, means for rotatably connecting the crankshaft with said first conveying means roller, and means for disengaging said rotatable connection with the first conveying means roller.

15. In a tobacco harvester as recited in claim 14, said means for disengaging the rotatable connection with the first conveying means roller comprising: a clutch between said first conveying means roller and crankshaft, a clutch actuation cam on said drive shaft, an indexing cam on the crankshaft means for releasibly connecting the clutch actuation cam and the indexing cam, a clutch engaging linkage, and means biasing the clutch engaging linkage against the indexing cam, whereby by rotation of the driveshaft rotates the clutch actuation cam, releasing the indexing cam and permitting the biasing means to move the clutch engaging linkage, thereby engaging the clutch.

16. In a tobacco harvester as recited in claim 4, the tobacco stick ejecting means additionally including a drivemotor, a panel-like frame, means for connecting the drivemotor for lifting the panel-like frame, means for controlling the drivemotor, and means for connecting the second sensor with the means for controlling the drivemotor.

17. In a tobacco stick harvester as recited in claim 16, and means for positioning an empty tobacco stick in alignment between said spear socket and said tobacco stick end support comprising: a spaced pair of pivoted stick supply arms, a way system adjacently beneath said arms, and means for drawing the stick supply arms toward said panel-like frame as the panel-like frame rises.

18. In a tobacco harvester as recited in claim 5, wherein the cutting means comprises a circular saw, an additional improvement comprising means for adjusting the axis of said saw in a fore-and-aft direction relative to said pair of laterally spaced upright rollers, and means for altering the position of at least one of said laterally spaced upright rollers relative to the other said upright roller and the saw.

19. In a tobacco harvester as recited in claim 18, respective drivemotors mounted to the circular saw and to each of said laterally spaced upright rollers, thereby providing for adjustment of position thereof which changing the respective drivemotor adjustments.

20. In a tobacco harvester as recited in claim 1, said harvester having a frame diagonally offset to one side, a tongue alongside the diagonal offset of the frame, a platform for an operator at the rearmost portion of the frame, and a connection beneath the platform for thereby drawing behind the harvester a vehicle for receiving tobacco offloaded by said an operator.

21. In a tobacco harvester having means for guiding, cutting and conveying tobacco plants and for impaling on tobacco sticks the stalks on said tobacco plants, the improvement comprising the combination: said harvester having a frame, said means for guiding tobacco plants affixed to a forward portion of the frame, said means for cutting tobacco plants affixed to the frame rearwardly of the means for guiding tobacco plants; said means for conveying tobacco plants including; a first conveyor having an intake portion above the means for cutting tobacco plants for receiving therefrom cut plants and a discharge portion located rearwardly and upwardly from the intake portion, a fore-and-aft shuttle positioned beneath the discharge portion of the first conveyor for receiving tobacco plants therefrom and for rearwardly urging said tobacco plants received, a second conveyor intermeshing with the shuttle and having at least two parallel conveying portions proximately spaced for urging stalks of tobacco received from the shuttle; a spear positioned between said at least two proximately spaced parallel conveying portions of the second conveyor, for impaling stalks of tobacco urged thereby, a pair of longitudinally spaced supports between said at least two proximately spaced parallel conveying portions of the second conveyor for holding a tobacco stick therebetween in alignment with the spear, and a stick ejector frame mounted adjacent the pair of longitudinally spaced supports.

* * * * *